(12) United States Patent
Becker et al.

(10) Patent No.: US 11,495,140 B2
(45) Date of Patent: Nov. 8, 2022

(54) LEARNING MANAGEMENT SYSTEMS WITH SHARED WELD TRAINING RESULTS

(71) Applicant: ILLINOIS TOOL WORKS INC., Glenview, IL (US)

(72) Inventors: William Joshua Becker, Manitowoc, WI (US); Amanda Rose Roe, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 11 days.

(21) Appl. No.: 16/519,478

(22) Filed: Jul. 23, 2019

(65) Prior Publication Data
US 2021/0027659 A1 Jan. 28, 2021

(51) Int. Cl.
*G09B 19/24* (2006.01)
*B23K 9/095* (2006.01)

(52) U.S. Cl.
CPC ............ *G09B 19/24* (2013.01); *B23K 9/0953* (2013.01)

(58) Field of Classification Search
CPC ............................... G09B 19/24; B23K 9/0953
See application file for complete search history.

(56) References Cited

U.S. PATENT DOCUMENTS

| | | | |
|---|---|---|---|
| 9,583,023 B2 | 2/2017 | Becker et al. | |
| 9,589,218 B2 | 3/2017 | Ciavatta | |
| 10,010,959 B2 | 7/2018 | Daniel | |
| 2012/0187184 A1* | 7/2012 | Challa | H04W 4/80 |
| | | | 235/375 |
| 2013/0119036 A1* | 5/2013 | Daniel | B23K 9/095 |
| | | | 219/130.21 |
| 2014/0272838 A1 | 9/2014 | Becker | |
| 2015/0056584 A1 | 2/2015 | Boulware et al. | |
| 2015/0072323 A1* | 3/2015 | Postlethwaite | G09B 19/003 |
| | | | 434/234 |
| 2015/0154884 A1* | 6/2015 | Salsich | B23K 9/0953 |
| | | | 434/234 |
| 2015/0375323 A1 | 12/2015 | Becker | |

(Continued)

FOREIGN PATENT DOCUMENTS

CA 3008087 6/2018

OTHER PUBLICATIONS

European Patent Office, Extended European Search Report, Appln No. 20186363.6 dated Dec. 15, 2020, 6 pages.

(Continued)

*Primary Examiner* — Malina D. Blaise
(74) *Attorney, Agent, or Firm* — McAndrews, Held & Malloy, Ltd.

(57) ABSTRACT

Systems and methods for learning management systems with shared weld training results are described. In some examples, weld training results may be shared with a learning management system and/or associated with a particular learning activity of the learning management system. In some examples, the weld training results (and/or a networked location where the weld training results are accessible) may be encoded in a machine readable graphic (e.g., a one dimensional, two dimensional, and/or matrix barcode). In some examples, the machine readable graphic may be read and/or decoded by a user device to obtain the weld training results. In some examples, a particular learning activity may also be encoded in the machine readable graphic.

20 Claims, 11 Drawing Sheets

(56) References Cited

U.S. PATENT DOCUMENTS

| | | |
|---|---|---|
| 2015/0379894 A1 | 12/2015 | Becker et al. |
| 2016/0125763 A1 | 5/2016 | Becker |
| 2016/0288236 A1 | 10/2016 | Becker |
| 2017/0032281 A1* | 2/2017 | Hsu .................... B23K 31/125 |
| 2017/0046974 A1* | 2/2017 | Becker .................. G09B 19/24 |
| 2017/0046975 A1 | 2/2017 | Becker et al. |
| 2017/0046976 A1 | 2/2017 | Becker et al. |
| 2017/0200394 A1* | 7/2017 | Albrecht ................. G09B 9/00 |
| 2017/0300634 A1* | 10/2017 | Chiang ................. G16H 10/60 |
| 2019/0087836 A1* | 3/2019 | Anbarasan ............ G06F 40/174 |
| 2021/0101218 A1* | 4/2021 | Schorghubler ......... B23K 9/295 |

OTHER PUBLICATIONS

European Patent Office, Extended European Search Report, Appln No. 20186367.7, dated Dec. 4, 2020, 8 pages.

European Office Action Appln No. 20186363.6 dated Dec. 17, 2021, 5 pages.

European Office Action Appln No. 20186367.7 dated Feb. 14, 2022, 6 pages.

\* cited by examiner

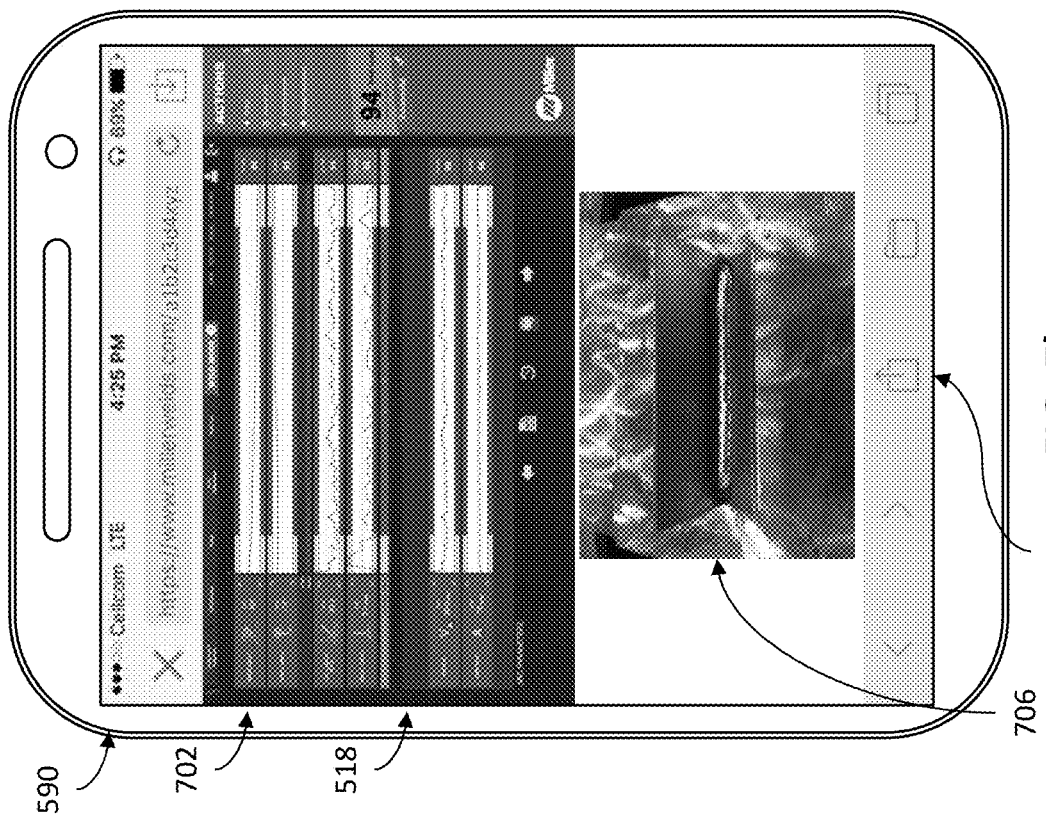
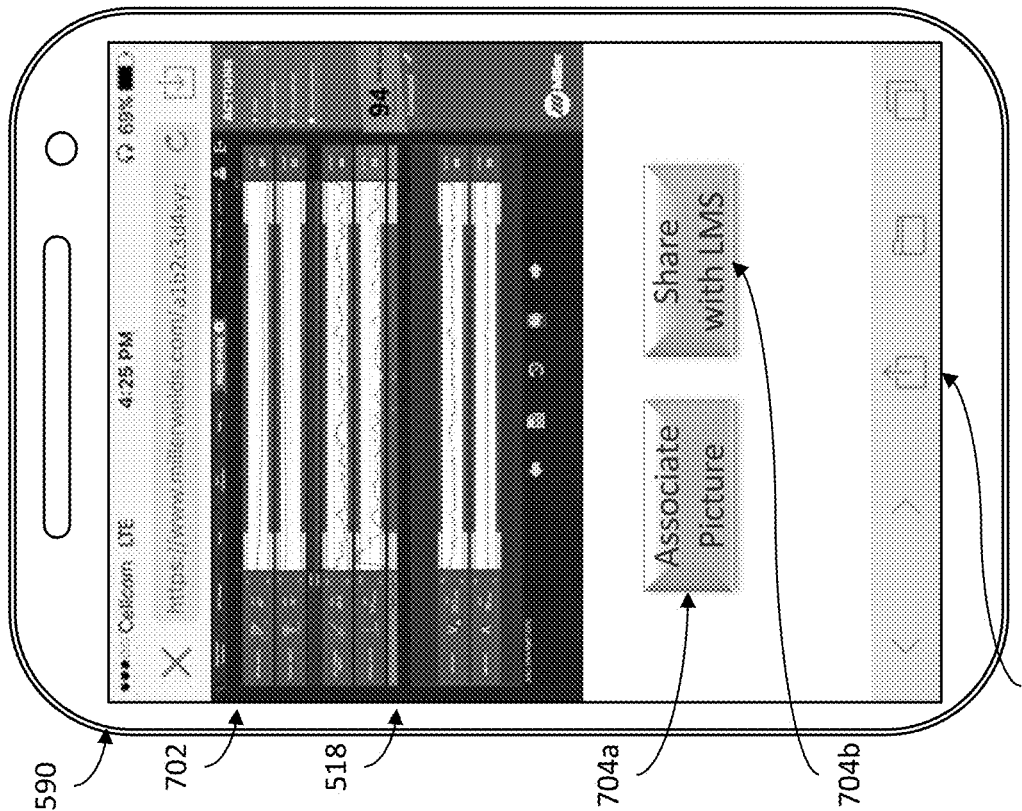
FIG. 7b
FIG. 7a

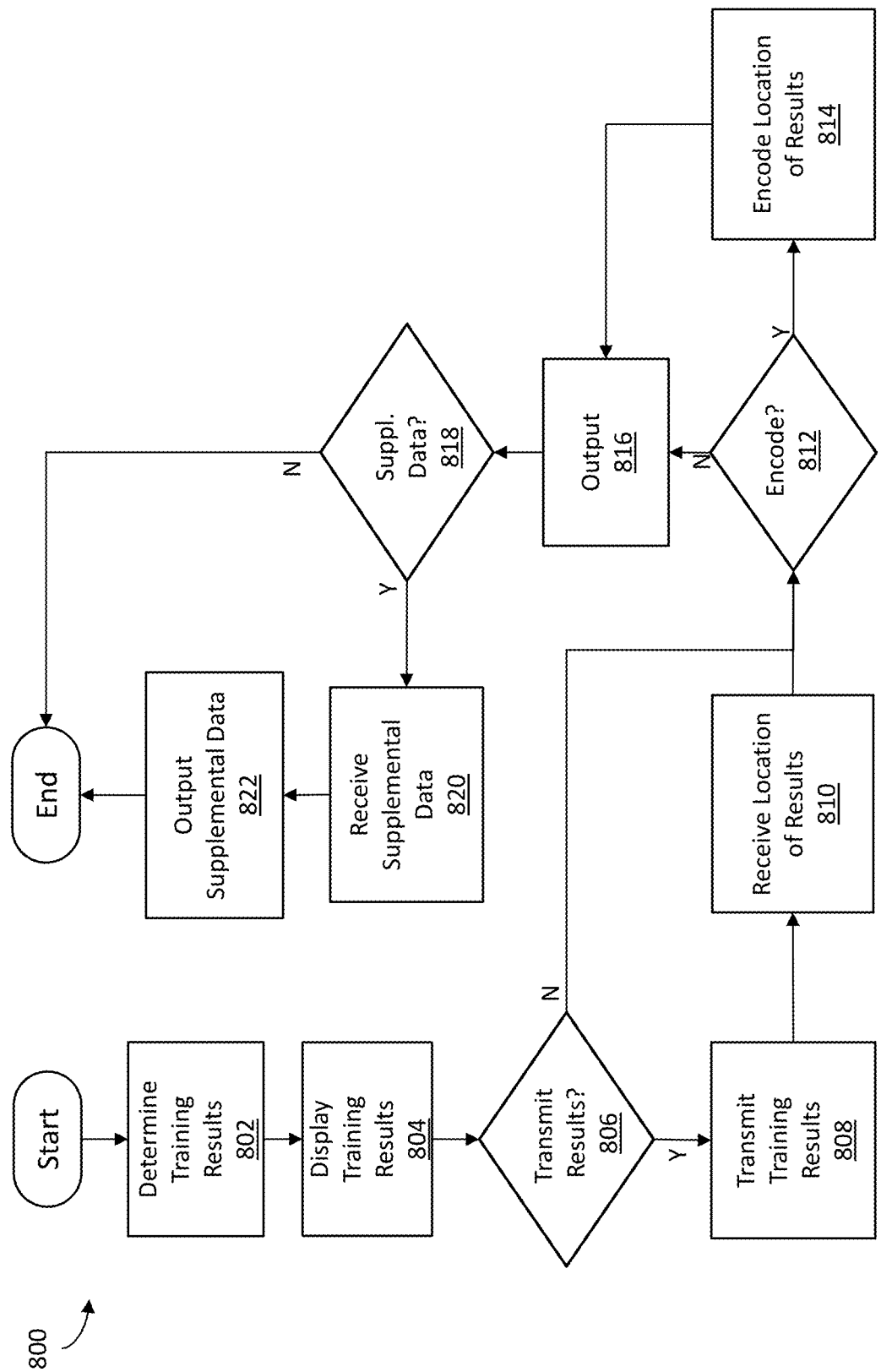

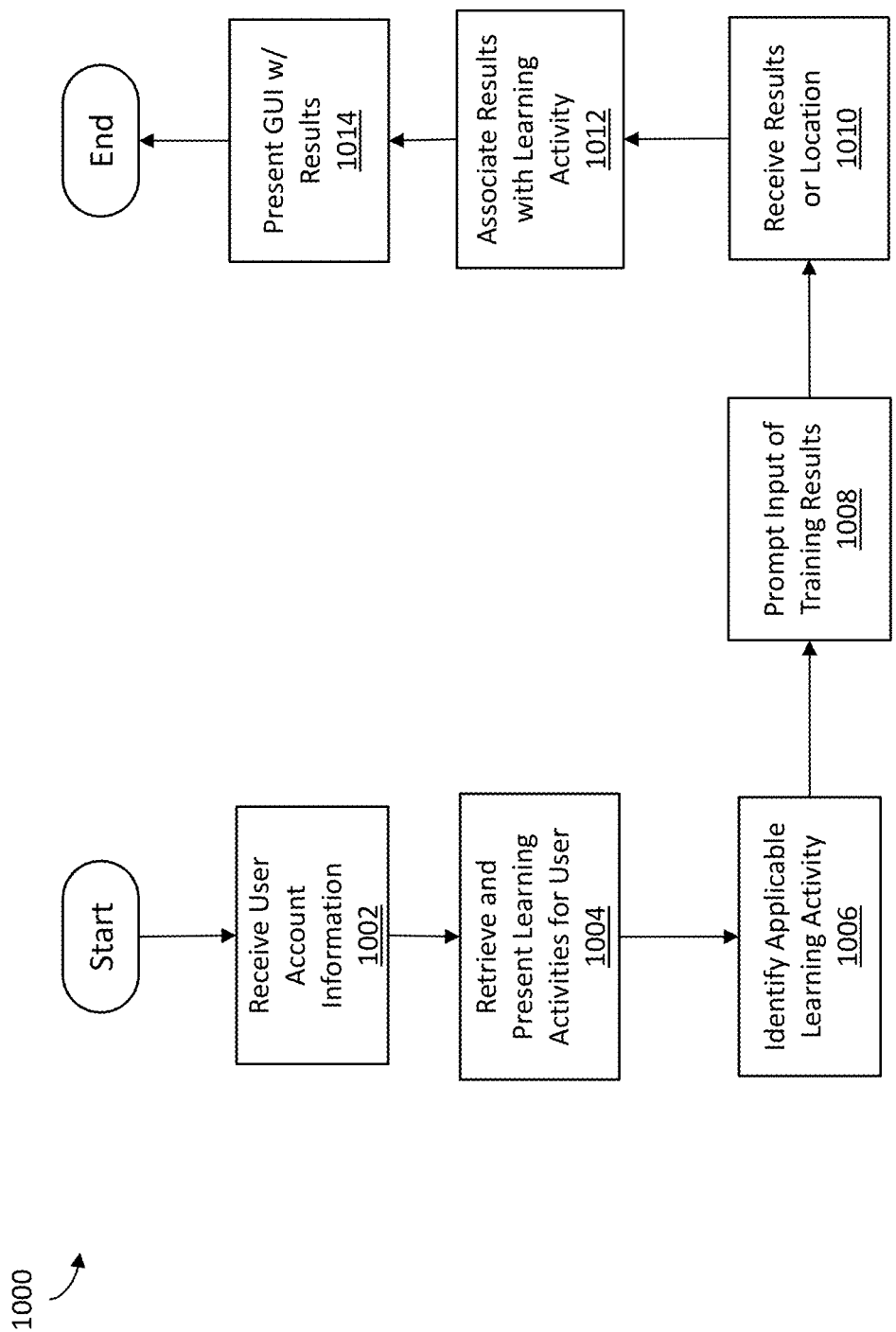

LEARNING MANAGEMENT SYSTEMS WITH SHARED WELD TRAINING RESULTS

TECHNICAL FIELD

The present disclosure generally relates to learning management systems and, more particularly, to learning management systems with shared weld training results.

BACKGROUND

The welding industry has a shortage of experienced and skilled operators. Additionally, even experienced welders have difficulty maintaining important welding techniques (e.g., torch work angles, torch travel angles, contact tip-to-work distance, travel speed, aim, etc.) throughout welding processes. Weld training systems make it possible for both experienced and inexperienced weld operators to practice producing high quality welds.

Learning management systems are sometimes used to facilitate weld training. Such systems may administer various lessons, tests, and/or other learning activities in the welding context to assist with weld training. Continued weld training can substantially increase proficiency for both experienced and inexperienced weld operators.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to learning management systems with shared weld training results, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

FIG. 7a shows an example result sharing screen displayed on a user device, in accordance with aspects of this disclosure.

FIG. 7b shows the example weld training result screen of FIG. 7a updated with supplemental data, in accordance with aspects of this disclosure.

FIG. 8 is a flowchart illustrating an example portion of the weld training program of FIG. 3, in accordance with aspects of this disclosure.

FIG. 10 is a flowchart illustrating an example learning management system (LMS) program that may be used with the LMS and/or user device of FIG. 5, in accordance with aspects of this disclosure.

Figure 1:
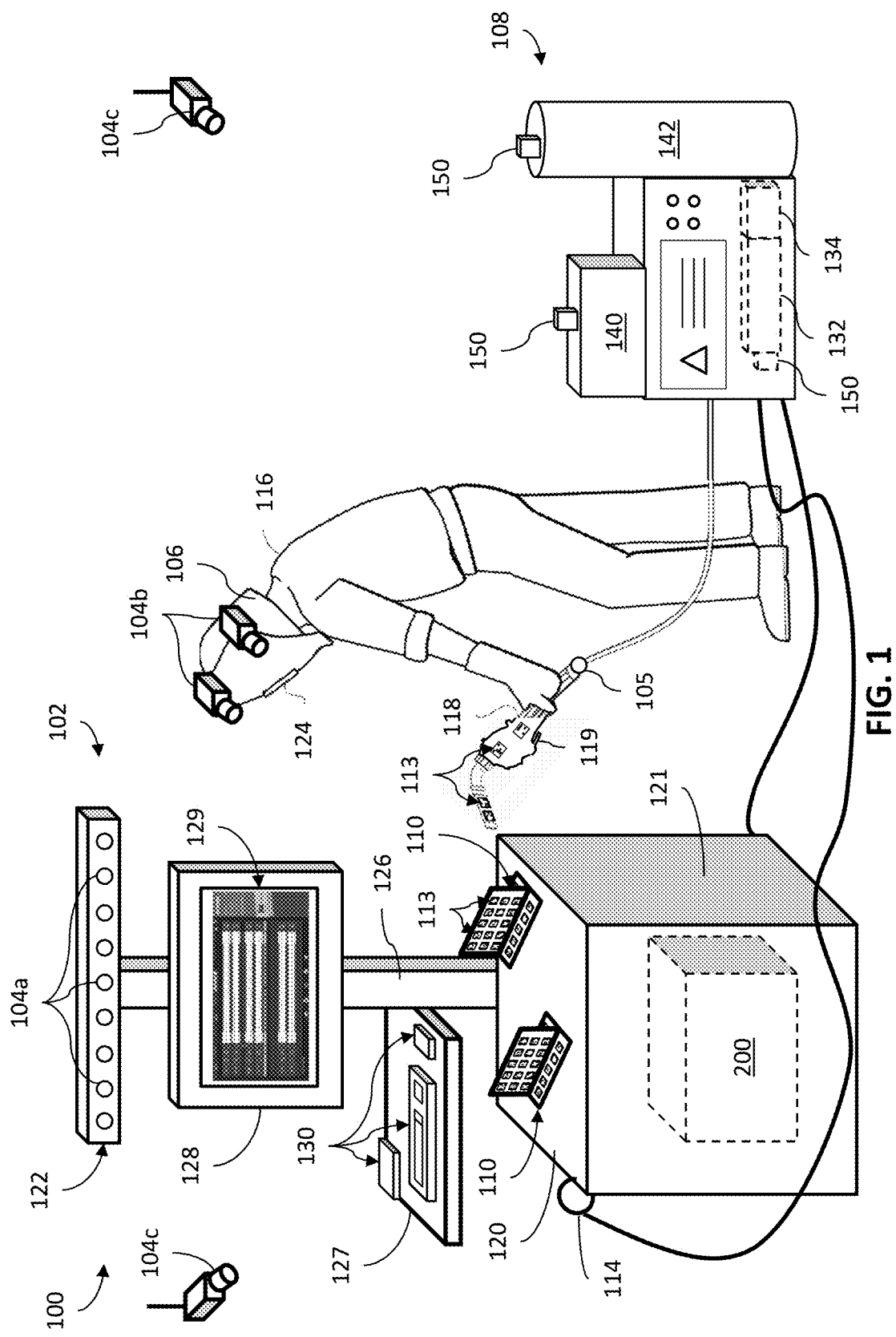
FIG. 1 shows an example of a weld training system, in accordance with aspects of this disclosure.

The figures are not necessarily to scale. Where appropriate, the same or similar reference numerals are used in the figures to refer to similar or identical elements. For example, reference numerals utilizing lettering (e.g., sensor 104a, sensor 104b) refer to instances of the same reference numeral that does not have the lettering (e.g., sensors 104).

DETAILED DESCRIPTION

Some examples of the present disclosure relate to a weld training system, comprising memory circuitry configured to store identification information of a weld operator, one or more sensors configured to detect a position or orientation of a welding torch during a weld training activity performed by the weld operator, control circuitry configured to determine weld training data pertaining to the weld training activity based, at least in part, on the position or orientation of the welding torch, and generate a machine-readable graphical encoding of the weld training data and the identification information, and a display screen configured to display the weld training data and the machine-readable graphical encoding.

In some examples, the machine-readable graphical encoding comprises a barcode or matrix barcode. In some examples, the machine-readable graphical encoding further encodes information identifying a learning activity of a learning management system. In some examples, the weld training system further comprises communication circuitry configured to receive supplemental data from a learning management system, the control circuitry further configured to associate the weld training data with the supplemental data. In some examples, the display screen is further configured to display the supplemental data. In some examples, the supplemental data comprises image, text, video, or audio data.

Some examples of the present disclosure relate to a method of associating weld training data pertaining to a weld training activity with a learning management system (LMS), comprising receiving at the LMS, via communication circuitry, identification information of a welding operator, identifying, via the LMS, one or more learning activities associated with the welding operator, based on the identification information, receiving a selected learning activity of the one or more learning activities, accessing the weld training data, and associating the weld training data with the selected learning activity and the identification information via processing circuitry of the LMS.

In some examples, accessing the weld training data comprises receiving the weld training data via a short wavelength ultra high radio frequency protocol, or a near field communication protocol. In some examples, accessing the weld training data comprises receiving data representative of a location where the weld training data is accessible and accessing the weld training data at the location. In some examples, providing graphical user interface (GUI) data representative of the weld training data. In some examples, the weld training data comprises first weld training data, and the GUI data is representative of a comparison of the first weld training data with second weld training data. In some examples, the first weld training data is associated with a first welding session and the second weld training data is associated with a second welding session. In some examples, the first welding session and second welding session, are both associated with the same geographical area, the same training class, the same team, the same welding operator, or the same welding competition.

Some examples of the present disclosure relate to a learning management system, comprising communication circuitry configured for communication with a user device via a network, processing circuitry, and memory circuitry comprising computer readable instructions which, when executed, cause the processing circuitry to receive, via the communication circuitry, identification information of a welding operator from the user device, identify one or more learning activities associated with the welding operator, based on the identification information, receive, via the communication circuitry, a selected learning activity of the one or more learning activities from the user device, access weld training data pertaining to a weld training activity of a weld training system, and associate the weld training data with the selected learning activity and the identification information.

In some examples, accessing the weld training data comprises receiving the weld training data via a short wavelength ultra high radio frequency protocol, or a near field communication protocol. In some examples, accessing the weld training data comprises receiving data representative of a location where the weld training data are accessible and accessing the weld training data at the location. In some examples, the memory circuitry further comprises computer readable instructions which, when executed, cause the processing circuitry to provide graphical user interface (GUI) data representative of the weld training data. In some examples, the weld training data comprises first weld training data, and the GUI data is representative of a comparison of the first weld training data with second weld training data. In some examples, the first weld training data is associated with a first welding session and the second weld training data is associated with a second welding session. In some examples, the first welding session and second welding session are both associated with the same geographical area, the same training class, the same team, the same welding operator, or the same welding competition.

Conventional weld training systems may present weld training results via a display screen of the weld training system. In some examples, the weld training results show how a particular participant performed during a training activity. Participants who performed well may wish to share weld training results (e.g., with other participants, friends, family, etc.). Facilitating sharing of weld training results can increase engagement and/or increase the chances that the participant will continue progressing in training.

However, conventional weld training systems are not configured for sharing of the training results. The few means that are available to share the training results are less than ideal. For example, a participant may take a picture of the training results with a mobile camera and share the picture. However, such a picture may be less clear, lower resolution, and/or lower quality than the original training results presented via the display screen of the weld training system. Additionally, the picture may provide no way for the training results to be manipulated, reorganized, modified, etc.

Some examples of the present disclosure relate to weld training systems that facilitate sharing of weld training results. In some examples, the weld training results may be uploaded to a central training system that provides access to the weld training results at a networked location (e.g., a webpage). High quality weld training results may be more easily shared via the networked location (e.g., using the webpage address, a mobile device, and/or some other networked device). In some examples, the central training system may send data representative of the networked location to the weld training system, and/or to the participant, so that the original high quality weld training results may be viewed and/or shared via the networked location.

In some examples, the weld training results (and/or the networked location where the weld training results are accessible) may be encoded in a machine readable graphic (e.g., a one dimensional, two dimensional, and/or matrix barcode). In some examples, the machine readable graphic may be displayed via the weld training system. In some examples, a training participant may use a user device to decipher the information encoded in the machine readable graphic, so as to access, view, and/or share the weld training results.

In some examples, the weld training results may additionally, or alternatively, be uploaded to a learning management system (LMS) using the machine readable graphic. In some examples, the weld training results may be evaluated by the LMS to determine whether a learning activity of the LMS was successfully completed. In some examples, graphical user interface (GUI) data representative of the weld training results may also be provided so that a participant can interact with and/or modify certain attributes of the weld training results. In some examples, a participant may additionally provide supplemental data to be associated with the weld training results through the GUI.

FIG. 1 shows an example of a weld training system 100. In some examples, some or all of the weld training system 100 may comprise a virtual, augmented, and/or mixed reality weld training system 100. As shown, the weld training system 100 comprises a welding stand 102, a welding tool 118, several sensors 104, and a welding-type power supply 108.

In the example of FIG. 1, an operator 116 wearing a welding helmet 106 is shown manipulating the welding tool 118 proximate the welding stand 102. In the example of FIG. 1, the welding helmet 106 includes a faceplate 124 through which the operator 116 can view the surrounding environment. In some examples, the faceplate 124 may include a helmet display (e.g., positioned within, behind, and/or adjacent the faceplate 124), such that the helmet display may be viewable by the operator 116 when wearing the helmet 106. In some examples, the helmet display may provide a virtual, augmented, or mixed reality experience to the operator 116.

In the example of FIG. 1, the welding tool 118 is coupled to the welding-type power supply 108 via a welding cable. In some examples, the tool 118 may additionally, or alternatively, be coupled to the welding stand 102. In the example of FIG. 1, the welding tool 118 is a welding torch or gun. In some examples, the welding tool 118 may be live welding tool capable of generating a live welding arc. In some examples the welding tool 118 may be a simulation (and/or mock) welding tool that is not capable of generating a live arc. In some examples, the welding tool 118 may be a live or simulated electrode holder (i.e., stinger) configured for shielded metal arc welding (SMAW). In some examples, the welding torch 118 may comprise a live or simulated torch and/or filler rod configured for gas tungsten arc welding (GTAW). In some examples, the welding torch 118 may comprise a live or simulated gun configured for flux-cored arc welding (FCAW).

While one welding tool 118 is shown in FIG. 1, in some examples, the weld training system 100 may include multiple welding tools 118. In some examples, the welding tool 118 may include one or more displays and/or indicators to provide data to the welding operator 116. In the example of FIG. 1, a sensing device 105 (e.g., accelerometer) is further integrated with the welding tool 118 to facilitate tracking of the position, orientation, and/or movement of the welding tool 118.

In the example of FIG. 1, the welding tool 118 is coupled to the welding-type power supply 108. As shown, the welding-type power supply 108 is also coupled to a clamp 114 that is attached to a support platform 120 of the welding stand 102. During live welding, the support platform 120, workpiece(s) 110, clamp 114, welding tool 118, and/or cables connecting the clamp 114 and/or welding tool 118 to the welding-type power supply 108 may form a closed circuit through which welding-type output power may be routed.

In the example of FIG. 1, the welding-type power supply 108 includes (and/or is coupled to) a wire feeder 140. In some examples, the wire feeder 140 houses a wire spool that is used to provide the welding tool 118 with a wire electrode (e.g., solid wire, cored wire, coated wire). In some examples, the wire feeder 140 further includes motorized rollers configured to feed the wire electrode to the tool 118 (e.g., from the spool) and/or retract the wire electrode from the tool 118 (e.g., back to the spool).

In the example of FIG. 1, the welding-type power supply 108 also includes (and/or is coupled to) a gas supply 142. In some examples, the gas supply 142 supplies a shielding gas and/or shielding gas mixtures to the welding tool 118. A shielding gas, as used herein, may refer to any gas (e.g., $CO_2$, argon) or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth).

In the example of FIG. 1, the welding-type power supply 108 also includes an operator interface 144. In the example of FIG. 1, the operator interface 144 comprises one or more adjustable inputs (e.g., knobs, buttons, switches, keys, etc.) and/or outputs (e.g., display screens, lights, speakers, etc.) on the welding-type power supply 108. In some examples, the operator 116 may use the operator interface 144 to enter and/or select one or more weld parameters (e.g., voltage, current, gas type, wire feed speed, workpiece material type, filler type, etc.) and/or weld operations (e.g., GMAW, GTAW, FCAW, live, simulated, etc.) for the welding-type power supply 108. In some examples, the operator interface 144 may further include one or more receptacles configured for connection to (and/or reception of) one or more external memory devices (e.g., floppy disks, compact discs, digital video disc, flash drive, etc.). In some examples, the operator 116 may additionally, or alternatively, use one or more input devices 130 of the welding stand 102 instead of the operator interface 144.

In the example of FIG. 1, the welding-type power supply 108 includes power conversion circuitry 132 configured to receive input power (e.g., from mains power, a generator, etc.) and convert the input power to welding-type output power. As shown, the welding-type power supply 108 further includes control circuitry 134 electrically coupled to and/or configured to control the power conversion circuitry 132. In some examples, the control circuitry 134 may include processing circuitry (and/or one or more processors) as well as analog and/or digital memory. In some examples, the control circuitry 134 is configured to control the power conversion circuitry 132, so as to ensure the power conversion circuitry 132 generates the appropriate welding-type output power for carrying out the desired welding-type operation.

In some examples, the control circuitry 134 is also electrically coupled to and/or configured to control the wire feeder 140 and/or gas supply 142. In some examples, the control circuitry 134 may control the wire feeder 140 to output wire at a target speed and/or direction. For example, the control circuitry 134 may control the motor of the wire feeder 140 to feed the wire electrode to (and/or retract the wire electrode 250 from) the tool 118 at a target speed. In some examples, the welding-type power supply 108 may control the gas supply 142 to output a target type and/or amount gas. For example, the control circuitry 134 may control a valve in communication with the gas supply 142 to regulate the gas delivered to the welding tool 118.

In the example of FIG. 1, the welding-type power supply 108 further includes several detectors 150. In some examples, the detectors 150 may be configured to sense, detect, and/or measure various welding data of the welding-type power supply 108. For example, the detectors 150 may sense, detect, and/or measure a voltage and/or current of the power received by the welding-type power supply 108, power conversion circuitry 132, and/or welding torch, and/or the voltage and/or current of the power output by the welding-type power supply 108 and/or power conversion circuitry 132. As another example, the detectors 150 may sense, detect, and/or measure a velocity (e.g., speed and/or feed direction) of the wire feeder 140 and/or type of wire being fed by the wire feeder 140. As another example, the detectors 150 may sense, detect, and/or measure a gas type and/or gas flow (e.g., through a valve) from the gas supply 142 to the welding tool 118. As another example, the detectors 150 may sense, detect, and/or measure a trigger signal (e.g., pull, release, etc.) of the welding tool 118, and/or a clamping signal (e.g., clamp, unclamp, etc.) of the clamp 117.

In some examples, a welding operation (and/or welding process) may be initiated when the operator 116 activates the trigger 119 of the welding tool 118 (and/or otherwise activates the welding tool 118). During a live welding operation, the welding-type power provided by the welding-type power supply 108 may be applied to the electrode (e.g., wire electrode) of the welding tool 118 in order to produce a welding arc between the electrode and the one or more workpieces 110. The heat of the arc may melt portions of a filler material (e.g., wire) and/or workpiece 110, thereby creating a molten weld pool. Movement of the welding tool 118 (e.g., by the operator) may move the weld pool, creating one or more welds 111. During a simulated welding operation, the weld training system 100 may simulate the welding-type power, welding arc, molten weld pool, and/or other aspects of the welding operation.

When the welding operation is finished, the operator 116 may release the trigger 119 (and/or otherwise deactivate the welding tool 118). In some examples, the control circuitry 134 may detect that the welding operation has finished. For example, the control circuitry 134 may detect a trigger release signal via detector(s) 150. As another example, the control circuitry 134 may receive a torch deactivation command via the operator interface 144 (e.g., where the tool 118 is maneuvered by a robot and/or automated welding machine).

In some examples, the control circuitry 134 may detect (e.g., via sensing device 105 and/or detectors 150) certain welding data pertaining to the welding-type power supply 108, clamp 117, and/or welding tool 118 during a welding process. In some examples, the control circuitry 134 is configured to communicate this welding data to the welding stand 102. In some examples, the control circuitry 134 may be configured to communicate the welding data to the welding stand 102 in real time, periodically during a welding operation, and/or after a welding operation.

In the example of FIG. 1, the welding stand 102 includes a support platform 120 to provide support for one or more workpieces 110 and/or various training devices. In some examples, the support platform 120 may include slots and/or apertures to aid in positioning and/or orienting the workpiece(s) 110. In some examples, the workpiece(s) 110 may include an extension configured to extend into one or more of the slots and/or apertures for alignment of the workpiece 110 with the one or more slots and/or apertures. In some examples, the position and/or orientation of the workpiece(s) 110, slots, and/or apertures may be used to calibrate the weld training system 100. For example, a calibration device configured to be sensed by the one or more sensors 104 may be inserted into an aperture and/or slot, while user input provided to the weld training system 100 indicates that the calibration device is inserted into the aperture and/or slot. In some examples, the welding platform 120 may additionally, or alternatively, include one or more emitters configured to emit a pattern onto the support platform 120, the workpiece 110, the welding tool 118, and/or the operator 116. The emitters may emit the pattern in the infrared, visible, and/or ultraviolet light spectrum for detection by the one or more sensors 104 to calibrate the position and/or the orientation of the support platform 120 relative to the one or more sensors 104.

In the example of FIG. 1, the welding stand 102 further includes an arm 126 connected to and extending vertically from the support platform 120. A display monitor 128 having a display screen 129 is connected to the arm 126. In some examples, the display screen 129 may be configured for displaying data and/or screens associated with welding (e.g., to display data corresponding to a weld training system 100). In some examples, a protective cover may be positioned over the display screen to block certain environmental elements from contacting the display screen 129 (e.g., weld spatter, smoke, sparks, heat, etc.). In some examples, the display monitor 128 may include additional output mechanisms, such as audio speakers, for example.

In the example of FIG. 1, a shelf 127 is also attached to the arm 126. The shelf 127 supports several input devices 130 of the welding stand 102. As shown, the input devices 130 comprise a mouse, keyboard, and short range scanner. In some examples, the scanner may be configured for retinal, fingerprint, palm print, face, and/or voice scanning. In some examples, the scanner may be configured as a short range radio transceiver for communication via near field communication (NFC), ultra high frequency radio wave (commonly known as Bluetooth), Zigbee, Rubee, and/or other protocols. In some examples, additional input devices 130 may be provided, such as, for example, one or more microphones. In some examples, the display screen 129 may be a touch screen, and may be further considered an input device 130. In some examples, the welding tool 118 may be considered an input device 130, and be configured with one or more buttons, screens, switches, knobs, and/or other mechanisms to provide input. In some examples, one or more of the input devices 130 may also be used as an output device (e.g., outputting data using NFC and/or Bluetooth communication).

In the example of FIG. 1, the welding stand 102 further includes a sensor assembly 122 attached to the arm 126. As shown, the sensor assembly 122 includes a plurality of sensors 104*a* oriented towards the platform 120. In some examples, the sensor assembly 122 may be adjustable, such as via one or more knobs and/or other adjustment mechanisms. In some examples, the senor assembly 102 (and/or sensors 104*a*) may be configured to track, detect, and/or record positions, orientations, and/or movement of objects in the welding environment during a welding operation.

In the example of FIG. 1, the weld training system 100 also includes several other sensors 104 configured to track, detect, and/or record positions, orientations, and/or movement of objects in the welding environment during a welding operation. In some examples, the objects the sensors 104 are configured to track, detect, and/or record may include the welding tool 118, workpiece(s) 110, welding stand 102, and/or operator 116. As shown, in addition to sensors 104*a*, the weld training system 100 includes sensors 104*b* attached to the welding helmet 106, and sensors 104*c* positioned around the welding environment. This arrangement of sensors 104 may enable some sensors 104 to monitor the welding environment (e.g., track movement of an object) when other sensors 104 are obscured. The sensors 104 may comprise, for example, motion sensors, depth sensors, cameras (e.g., infrared cameras, visible spectrum cameras, high dynamic range cameras, etc.), acoustic sensors, optical sensors, and/other appropriate sensors.

In the example of FIG. 1, the welding tool 118 and workpieces 110 include markers 113 configured to be detected by the one or more sensors 104. In some examples, the support platform 120 may also include one or more markers built into and/or attached to the support platform to calibrate a position and/or an orientation of the support platform 120 relative to one or more sensors without a separate calibration device. In some examples, the markers 113 may be passive markers, such as, for example, reflective markers. In some examples, the markers 113 may be active markers, such as, for example, light-emitting markers (e.g., light-emitting diodes (LEDs)). In examples, in which the markers 113 are active markers, the markers 113 may be powered by electrical components within the welding tool 118. In some examples, the markers 113 may assist the weld training system 100 (e.g., via sensors 104) in tracking the welding tool 118 and/or workpiece(s) 110, and/or determining position and/or orientation of the welding tool 118 and/or workpiece(s) 110.

In some examples, the sensors 104 may be communicatively coupled to a computing system 200. For example, the sensors 104 may comprise communication circuitry to facilitate wired and/or wireless communication with the computing system 200. In some examples, the sensors 104 are configured to provide data (e.g., image data, acoustic data, sensed data, six degrees of freedom (6DOF) data, etc.) to the computing system 200, such as via one or more signals, for example. In some examples, the sensors 104 are further configured to receive data (e.g., configuration data, setup data, commands, register settings, etc.) from the computing system 200. In the example of FIG. 1, the computing system 200 is disposed within a cabinet 121 of the welding stand 102.

Figure 2:
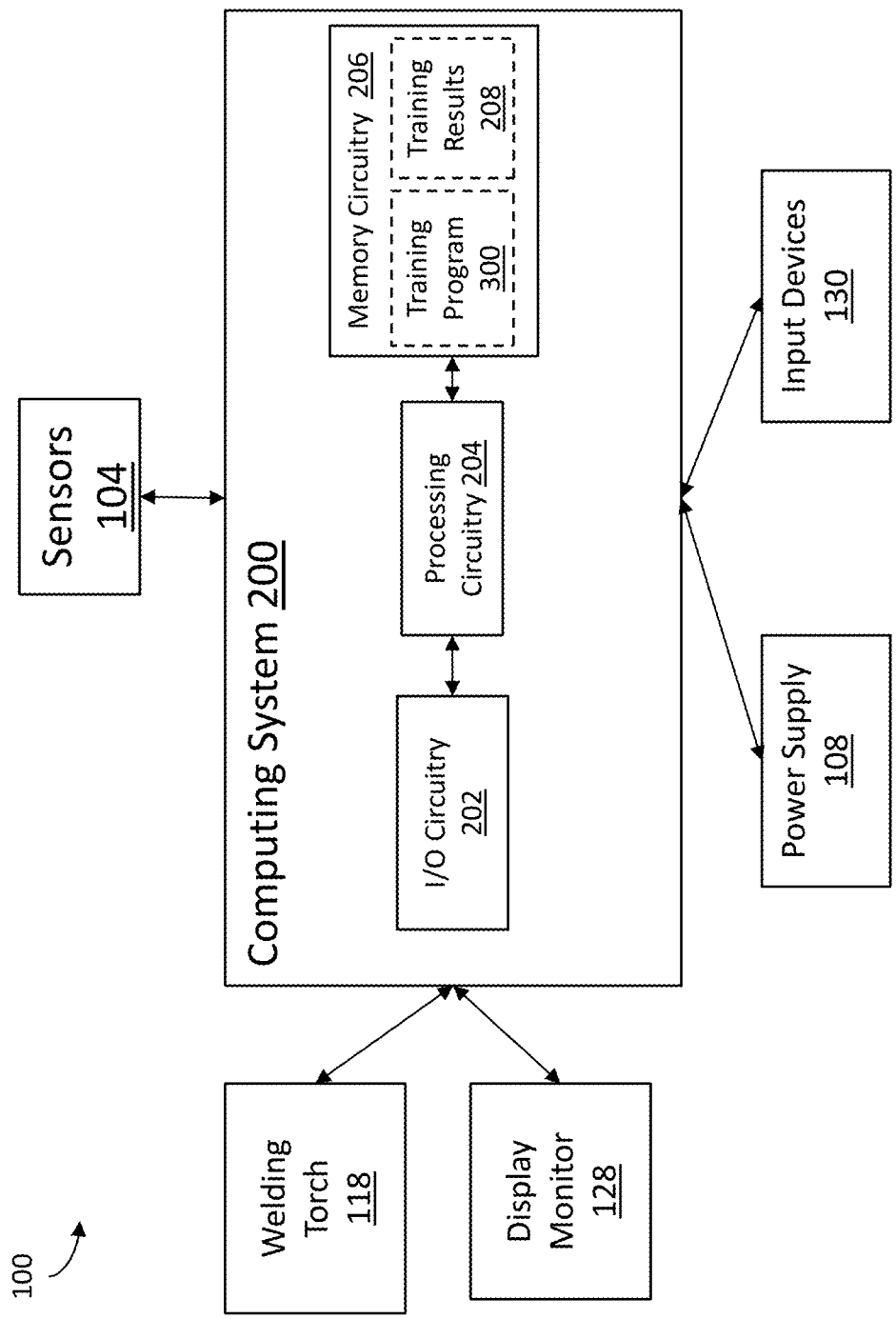
FIG. 2 is a block diagram showing example components of the weld training system of FIG. 1, in accordance with aspects of this disclosure.

In the example of FIG. 2, the computing system 200 is coupled to and/or in communication with the sensors 104, welding tool 118, display monitor 128, welding-type power supply 108, and input devices 130. In some examples, the computing system 200 may additionally be coupled to and/or in communication with a helmet display of the welding helmet 106. As shown, the computing system 200 includes memory circuitry 206, processing circuitry 204, and input/output (I/O) circuitry 202.

In some examples, the I/O circuitry 202 may comprise communication circuitry for communicating with other systems over one or more networks (e.g., the Internet). In some examples, the communication circuitry may include one or more wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the communication circuitry may be configured to facilitate communication via one or more wired media and/or protocols (e.g., Ethernet cable(s), universal serial bus cable(s), etc.) and/or wireless mediums and/or protocols (e.g., near field communication (NFC), ultra high frequency radio waves, IEEE 802.11x, Zigbee, HART, LTE, Z-Wave, WirelessHD, WiGig, etc.). In some examples, the I/O circuitry 202 may additionally comprise circuitry for interfacing with the various devices coupled to and/or in communication with the computing system 200, such as, for example, the sensors 104, welding torch 118, display monitor 128, power supply 108, and/or input devices 130.

In some examples, the processing circuitry 204 comprises one or more processors used to execute machine readable instructions stored in memory 206. In some examples, the memory 206 stores machine readable instructions that drive some or all of the functions of the various devices coupled to and/or in communication with the computing system 200. In some examples, some or all of the data stored in the memory 206 of the computing system 200 may additionally, or alternatively, be stored in an external and/or remote memory (e.g., a remote server, the cloud, an external hard drive, etc.).

Figure 3:
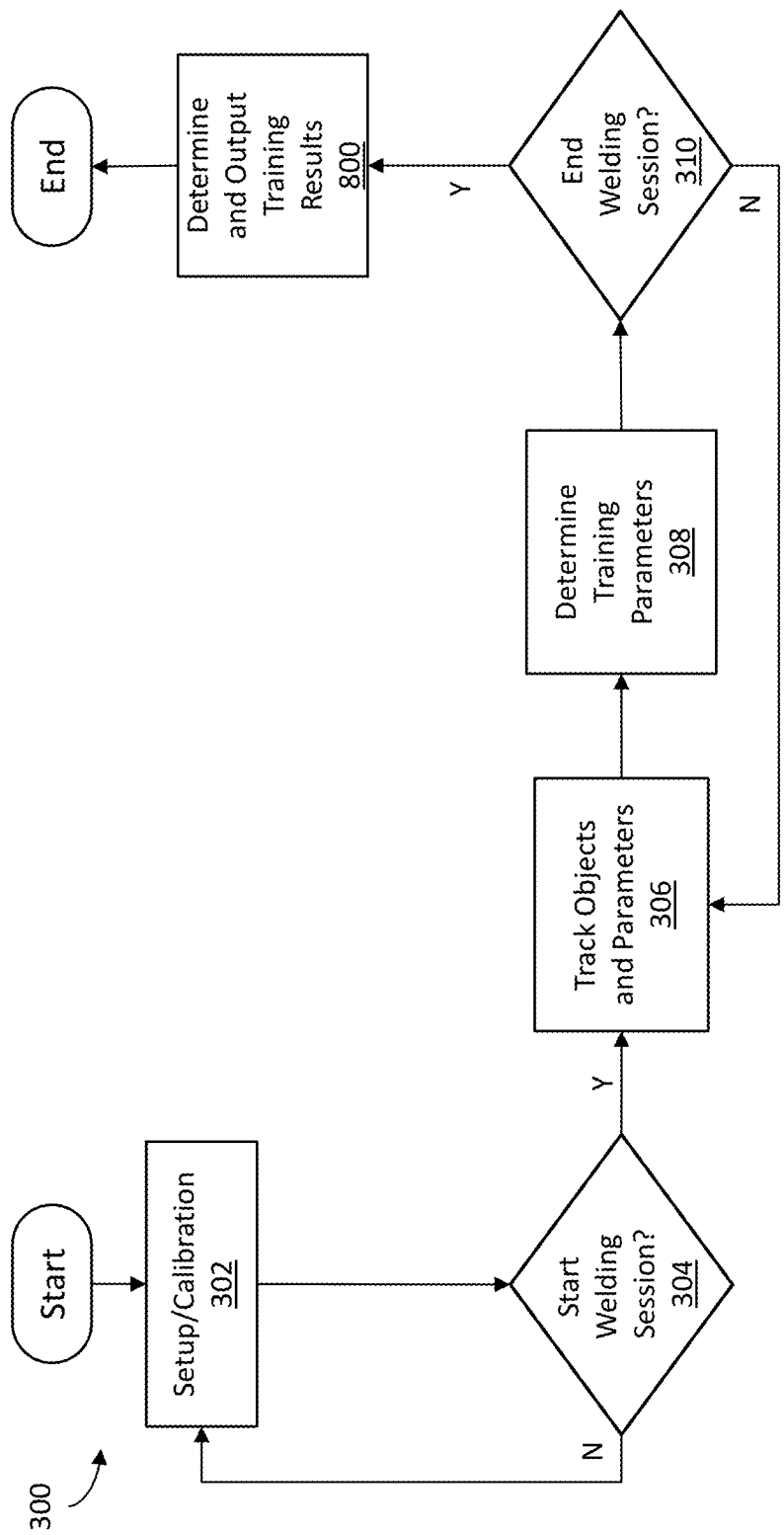
FIG. 3 is a flowchart illustrating an example weld training program that may be used with the weld training system of FIG. 1, in accordance with aspects of this disclosure.

In the example of FIG. 2, the memory 206 of the computing system 200 stores a weld training program 300 and training results 208 of the weld training program 300. FIG. 3 is a flowchart illustrating an example weld training program 300 of the computing system 200. In some examples, the weld training program 300 may be implemented in machine readable (and/or processor executable) instructions stored in memory 206 of the computing system 200 and/or executed by the processing circuitry 204.

In the example of FIG. 3, the weld training program 300 begins at block 302. At block 302, the weld training program 300 performs certain setup and/or calibration operations. For example, the weld training program 300 may use data from the sensors 104 to track one or more markers and/or calibration tools and perform necessary calibrations for the welding stand 102. As another example, the weld training program 300 may receive one or more signals from the input devices 130 indicative of a selection of a simulation or live arc mode. As another example, the weld training program 300 may receive one or more signals from the input devices 130 indicative of a selection of one or more welding operations, weld training activities, settings, and/or parameters. As another example, the weld training program 300 may receive one or more signals from the input devices 130 indicative of a user login and/or user credentials.

In the example of FIG. 3, the weld training program 300 proceeds to block 304 after block 302. At block 304, the weld training program 300 determines whether a welding session should begin and/or has begun. In some examples, a welding session may comprise one or more welding operations. In some examples, the welding session may be part of a weld training activity. In some examples, the determination at block 304 may comprise determining whether there has been a selection to begin a welding session, weld training activity, and/or welding operation (e.g., via the input devices 130 and/or operator interface 144). In some examples, the determination may comprise determining whether block 302 has been satisfactorily completed. In some examples, the determination may comprise determining whether the welding tool 118 has been activated (e.g., via trigger 119). If the weld training program 300 determines that the welding session should not begin or has not begun, then the weld training program 300 returns to block 302. If the weld training program 300 determines that the welding session should begin or has begun, the weld training program 300 proceeds to block 306.

In the example of FIG. 3, the weld training program 300 tracks objects (e.g., the welding tool 118, workpiece(s) 110, welding stand 102, operator 116, etc.) in the nearby welding environment, as well as the welding parameters of the welding-type power supply 108, at block 306. In some examples, the weld training program 300 may use data received from the sensors 104, detectors 150, input devices 130, control circuitry 134, and/or other components of the weld training system 100 to perform this tracking. For example, the weld training program 300 may determine one or more positions and/or orientations of the welding tool 118, workpiece(s) 110, and/or operator 116 relative to the support platform 120 and/or other elements of the weld training system 100 based on data captured by the sensors 104. Additionally, the weld training program 300 may determine one or more relevant welding parameters based on data received from the detectors 150 of the welding-type power supply 108.

In the example of FIG. 3, the weld training program 300 proceeds to block 308 after block 306. At block 308, the weld training program 300 determines one or more weld training parameters based on the data received and/or tracking performed at block 306. In some examples, the weld training parameters may include, for example, work angle, travel angle, aim, contact to work distance, arc length, travel speed, voltage, current, amperage, wire feed speed, gas disbursement, deposition amount, porosity, penetration, and/or other parameters that may be relevant and/or helpful to evaluating performance. In some examples where the weld training system 100 is a simulated (e.g., virtual, augmented, and/or mixed reality) weld training system, the training parameters may include simulation parameters (e.g., simulation images, audio, video, etc.).

In the example of FIG. 3, the weld training program 300 proceeds to block 310 after block 308. At block 310, the weld training program 300 determines whether the welding session has or should be ended. In some examples, this determination may comprise determining whether there has been a selection to end the welding session and/or welding operation (e.g., via the input devices 130 and/or operator interface 144). In some examples, the determination may comprise determining whether the welding tool 118 has been deactivated (e.g., via trigger 119). If the weld training program 300 determines that the welding session has not or should not be ended, then the weld training program 300 returns to block 306. If the weld training program 300 determines that the welding session has or should be ended, the weld training program 300 proceeds to block 800.

In the example of FIG. 3, the weld training program 300 determines a package of training results 208 based on the training parameters of block 308 (and/or the data received and/or tracking performed at block 306). In some examples, the training results 208 may comprise one or more scores, grades, ratings, collections of training parameters, summaries of welding sessions (and/or welding operation, training activity, etc.), user (and/or operator 116, participant, etc.) information, and/or other weld training data pertaining to the welding session(s) (and/or welding operation(s), training activities, etc.). In some examples, one or more of the collections of training parameters may be synchronized over time and/or packaged in a format that may be viewed and/or manipulated via a GUI that is displayed via the display screen 129 (and/or helmet display). In some examples, the scores, grades, and/or ratings may be based at least in part on a comparison of the welding parameters, training parameters, and/or training results 208 with one or more prior welding parameters, training parameters, and/or training results 208 (e.g., stored in memory 206). In some examples, the computing system 200 may associate the training results 208 and/or training parameters with the identity of the operator 116, such as via a unique number associated with the operator 116, the name of the operator 116, and/or other identification information of the operator 116.

At block 800, the weld training program 300 additionally outputs the training results 208. In some examples, outputting the training results 208 may comprise outputting to the display screen 129 and/or other output mechanism of the weld training system 100. In some examples, outputting the training results 208 may comprise sending the training results 208 to a central training system 510 and/or LMS 550, as further discussed below. While shown as executing following the end of the welding session at block 310, in some examples block 800 may execute prior to the end of the welding session. For example, the weld training program 300 may continuously determine and/or output the training results 208 in real time during the welding session, so as to enable live streaming. In the example of FIG. 3, the weld training program 300 ends after block 800.

Figure 4:
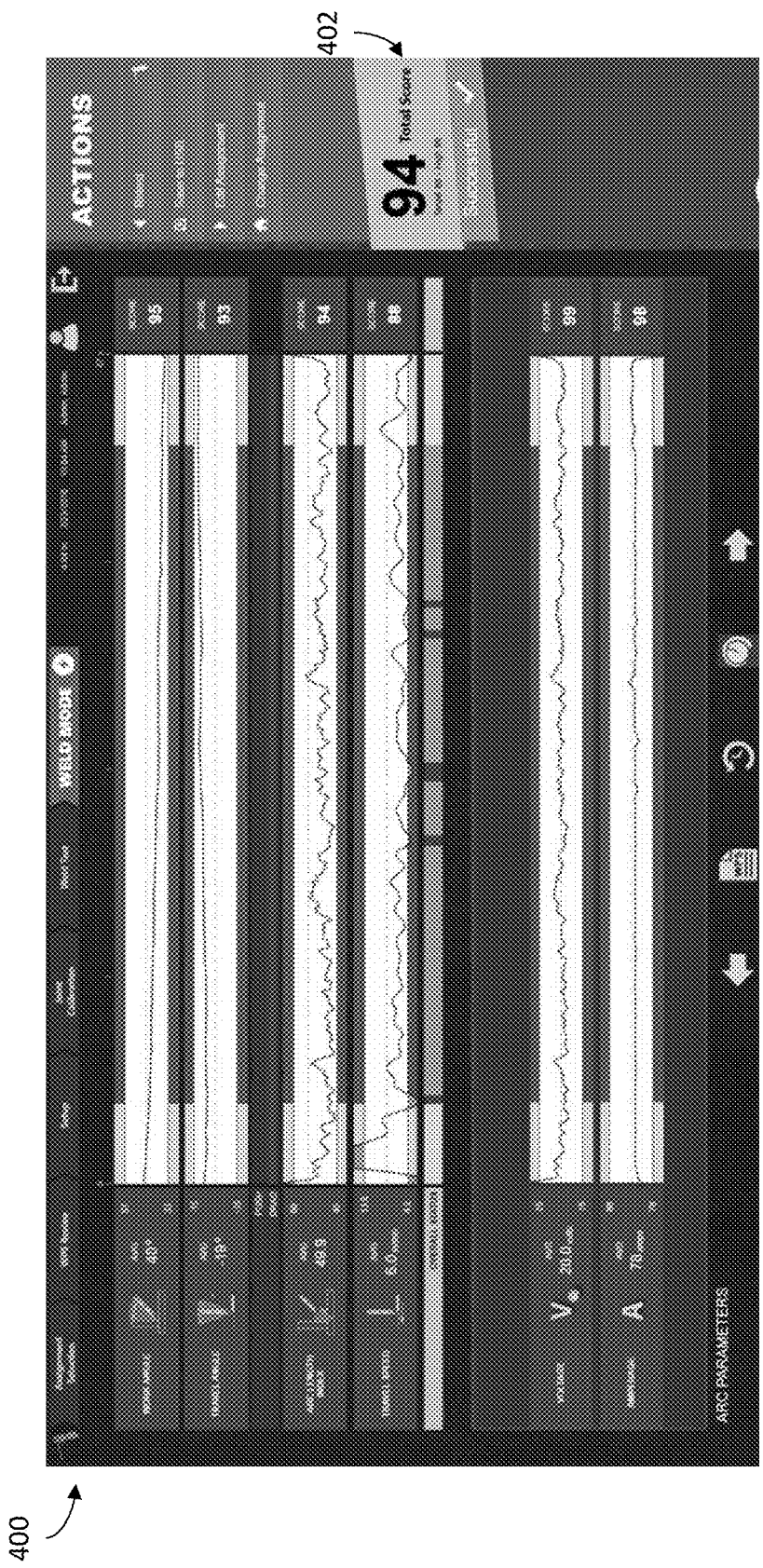
FIG. 4 shows an example training results screen that might be shown to a user of the weld training system of FIG. 1, in accordance with aspects of this disclosure.

FIG. 4 shows an example training results screen 400 that might be shown to a user (e.g., via the display monitor 128) at block 800 of the weld training program 300. As shown, the training results screen 400 shows visual representations (e.g., graphs) of work angle, travel angel, arc length, travel speed, voltage, and amperage training parameters over a time period of the welding session. Additionally, a score 402 is provided.

Participants who wish to share weld training results (e.g., with other participants, friends, family, etc.) using conventional weld training systems may take a picture of the training results screen 400, such as with a mobile camera, for example. However, the training results 208 in such a picture may be less clear, lower resolution, and/or lower quality than the training results 208 presented via the training results screen 400. The present disclosure therefore contemplates sending the weld training results 208 to a central training system 510 that provides access to the weld training results 208 at a networked location (e.g., a webpage). In some examples, high quality weld training results 208 may be more easily shared via the networked location (e.g., using the webpage address, a mobile device, and/or some other networked device).

Figure 5:
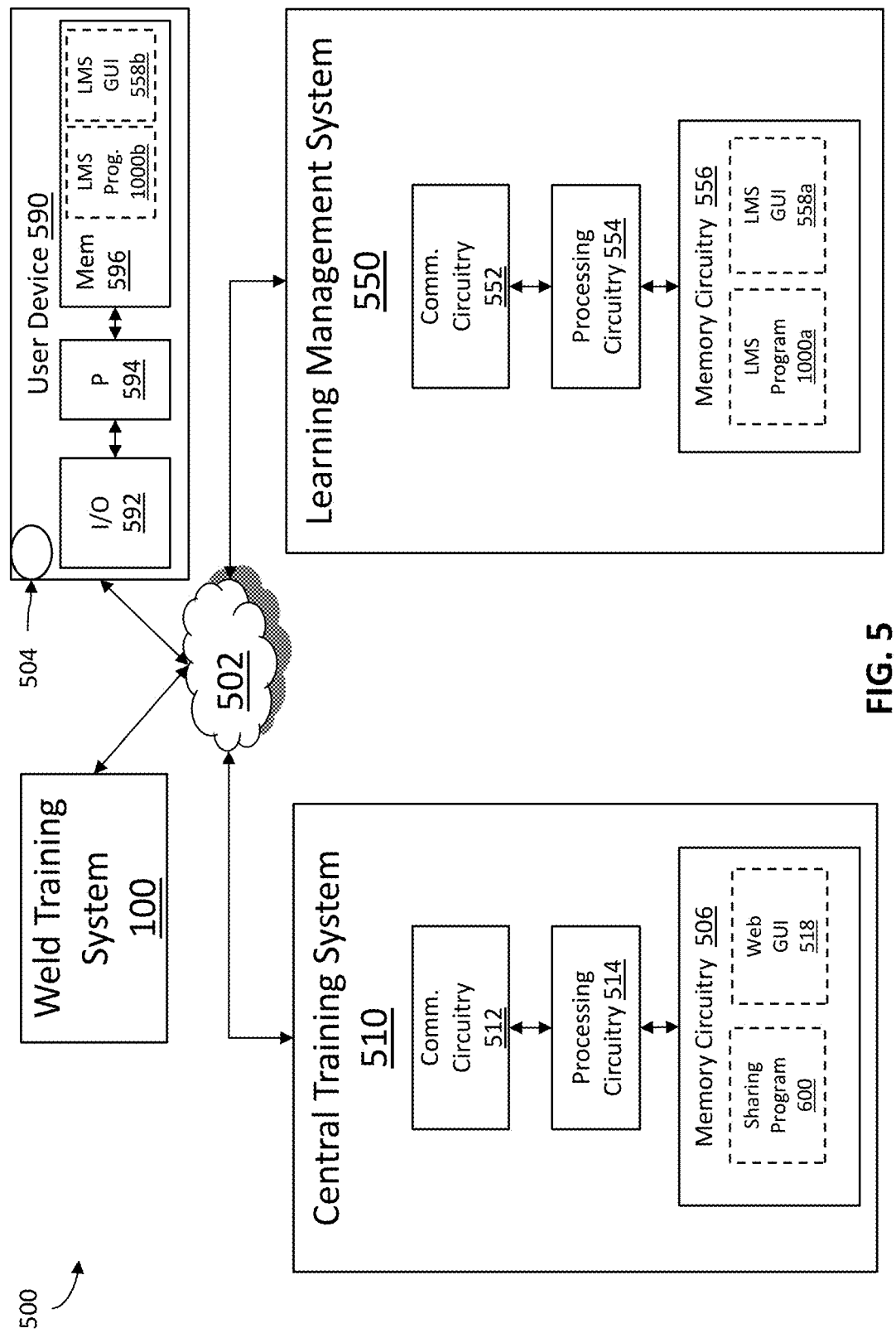
FIG. 5 is a block diagram showing an example shared weld training system, in accordance with aspects of this disclosure.

FIG. 5 is a block diagram showing an example shared weld training system 500. In the example of FIG. 5, the shared weld training system 500 includes the weld training system 100 of FIG. 1 in communication with a central training system 510 and a learning management system (LMS) 550 through a network 502 (e.g., a private internal network, a local area network, the Internet, etc.). In some examples, the LMS 550 may be part of the central training system 510, or vice versa. In some examples, the LMS 550 and/or central training system 510 may comprise one or more servers. As shown, the shared weld training system 500 also includes a user device 590 (e.g., mobile phone, laptop, desktop, tablet, etc.). In some examples, the user device 590 may be in communication with the LMS 550 and/or central training system 510 over the network 502. In some examples, the user device 590 may also be in communication with the weld training system 100.

In the example of FIG. 5, the central training system 510 comprises central communication circuitry 512, central processing circuitry 514, and central memory circuitry 516 coupled together via a common electrical bus. As shown, the LMS 550 comprises LMS communication circuitry 552, LMS processing circuitry 554, and LMS memory circuitry 556 coupled together via a common electrical bus. As shown, the user device 590 comprises a camera 504, as well as device I/O circuitry 592, device processing circuitry 594, and device memory circuitry 596 coupled together via a common electrical bus. In some examples, the device I/O circuitry 592 may comprise device communication circuitry configured for communication with external systems, as well as circuitry that operates a user interface (e.g., touchscreen, keys, microphone, speakers, buttons, switches, knobs, lights, etc.) and camera 504 of the user device 590.

In some examples, the central processing circuitry 514, LMS processing circuitry 554, and/or device processing circuitry 594 may comprise one or more processors. In some examples, the central communication circuitry 512, LMS communication circuitry 552, and/or device I/O circuitry 592 may comprise one or more wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the central communication circuitry 512, LMS communication circuitry 552, and/or device I/O circuitry 592 may comprise information technology equipment, telecommunication network infrastructure equipment, and/or telecommunication terminal equipment. In some examples, the central communication circuitry 512, LMS communication circuitry 552, and/or device I/O circuitry 592 may be configured to facilitate communication via one or more wired media and/or protocols (e.g., Ethernet cable(s), universal serial bus cable(s), etc.) and/or wireless mediums and/or protocols (e.g., near field communication (NFC), ultra high frequency radio waves, IEEE 802.11x, Zigbee, HART, LTE, Z-Wave, WirelessHD, WiGig, etc.). In some examples, the communication circuitry 202, central communication circuitry 512, LMS communication circuitry 552, and/or device I/O circuitry 592 may coordinate communications over the network 502, and/or cooperate to communicate with one another.

In the example of FIG. 5, the LMS memory circuitry 556 stores an LMS program 1000a and LMS GUI data 558a, discussed further below. As shown, the device memory circuitry 596 stores a corollary LMS program 1000b and LMS GUI data 558b, as discussed further below. In the example of FIG. 5, the central memory circuitry 516 stores a result sharing program 600 and web GUI data 518. In some examples, the central memory circuitry 516 may also store training results 208 communicated from the computing system 200.

In some examples, the result sharing program 600 may store the training results 208 (and/or data representative of the training results 208) at a location (e.g., in central memory 506) where they may be accessed (e.g., via the network 502). In some examples, the location may be associated with a pathway and/or address. In some examples, the training results 208 may be publicly accessible at the location. In some examples, access to the training results 208 at the location may be restricted (e.g., to users associated with certain credentials, privileges, permissions, etc.). In some examples, the result sharing program 600 may communicate the location where the training results 208 are accessible to the computing system 200. In some examples, the training results 208 may be made accessible via the web GUI data 518. In some examples, the web GUI data 518 may provide an interface through which a user can manipulate certain parameters (e.g., time period, visible training parameters, comparative data, etc.) to gain different perspectives, views, and/or representations of the training results 208.

Figure 6:
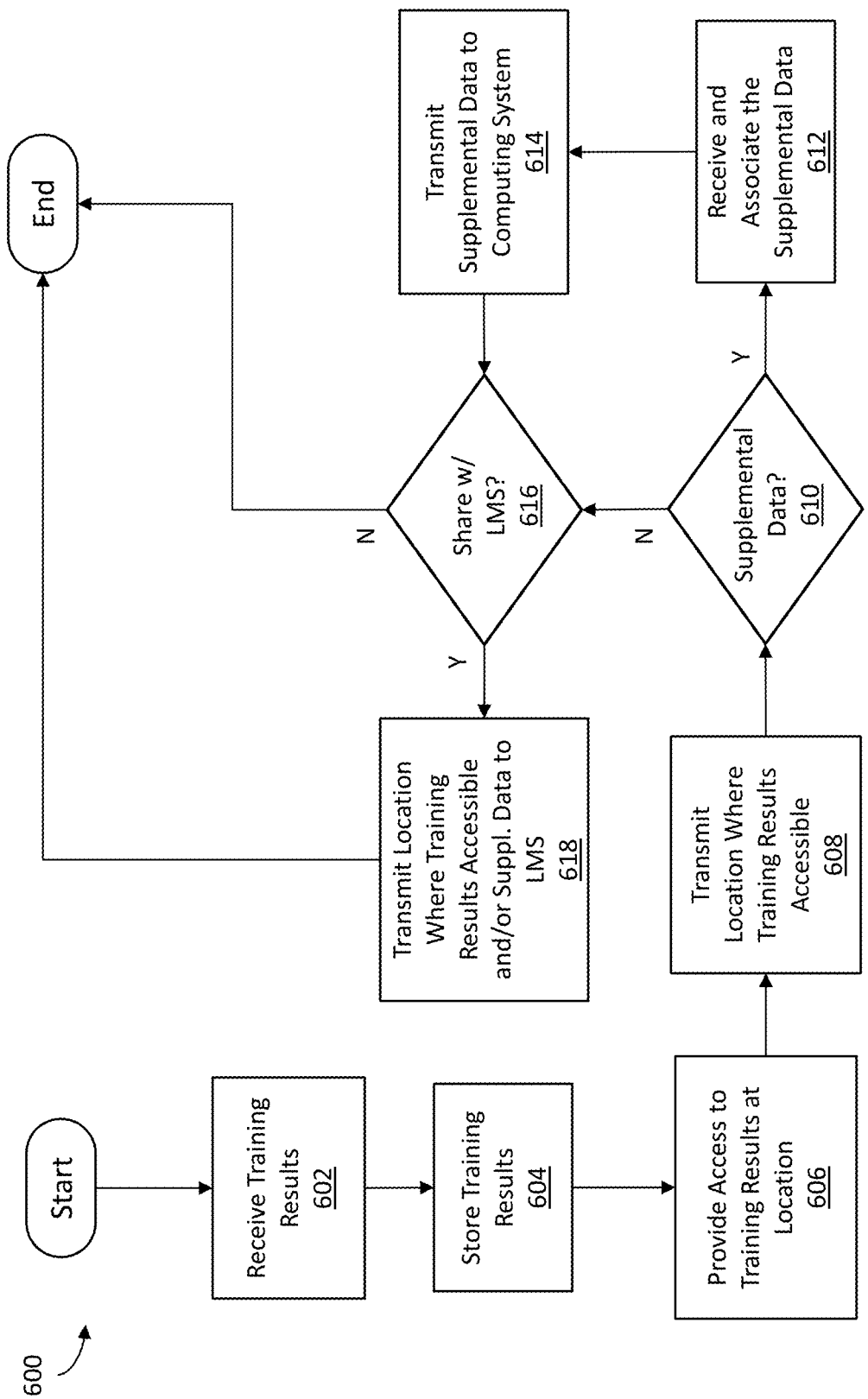
FIG. 6 is a flowchart illustrating an example weld training program that may be used with the weld training system of FIG. 1, in accordance with aspects of this disclosure.
Figure 9:
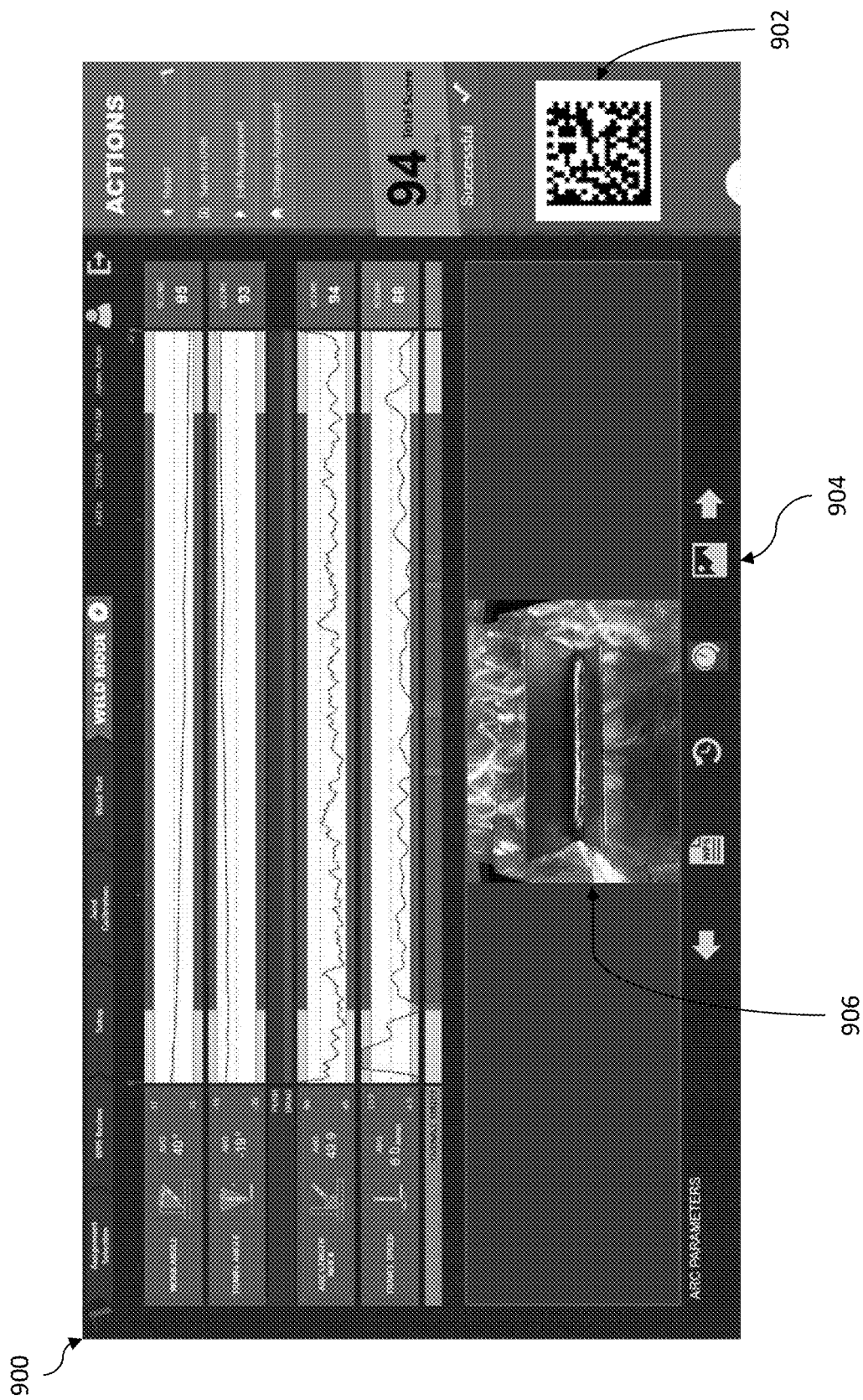
FIG. 9 shows the example training results screen of FIG. 4, updated with a machine readable graphic and supplemental data, in accordance with aspects of this disclosure.

FIG. 6 is a flowchart illustrating an example result sharing program 600 of the central training system 510. In some examples, the result sharing program 600 may be implemented in machine readable instructions stored in the central memory circuitry 506 of the central training system 510 and/or executed by the central processing circuitry 514. In some examples, some portions of the result sharing program 600 may comprise a web based application (e.g., executed and/or interacted with through a web browser). In some examples, the result sharing program 600 may store the training results 208 (and/or some representation of the training results 208) at a location where they may be accessed (e.g., via the network 502), and communicate that location back to the computing system 200, via the result sharing program 600.

In the example of FIG. 6, the result sharing program 600 begins at block 602, where the central training system 510 receives the training results 208 from the weld training system 100 (e.g., computing system 200). After block 602, the result sharing program 600 proceeds to block 604, where the central training system 510 stores the training results 208. In some examples, the training results 208 may be stored at a machine and/or network accessible location, such as, for example, a location in central memory circuitry 506. In some examples, the location may comprise some other networked location, such as a memory location of a connected and/or associated server. In some examples, the location may be associated with a pathway and/or address.

In the example of FIG. 6, the result sharing program 600 proceeds to block 606 after block 604. At block 606, result sharing program 600 provides access to the training results 208. In some examples, this may involve configuring certain settings of the central training system 510 allow the location at which the training results 208 are stored to be publicly accessed and/or accessed provided one or more restrictions are met (e.g., user permissions, accessing device, etc.). In some examples, some portions of the training results 208 may be publicly accessible by all, while other portions may be accessible only to those with certain permissions, and/or still other portions may be accessible only to those with higher level permissions. In some examples, providing access to the training results 208 at block 606 may comprise formatting, packaging, and/or otherwise presenting the training results 208 so that a user may easily view the training results 208 when accessing. In some examples, providing access to the training results 208 at block 606 may comprise providing web GUI data 518 representative of the training results 208, such that a user may view and/or manipulate the training results 208 via the web GUI data 518. In some examples, providing the web GUI data 518 may entail generating and/or transmitting the web GUI data 518 (e.g., to user device 590). In some examples, the training results 208 may be used to generate the web GUI data 518. In some examples, providing access to the training results 208 at block 606 may comprise providing web GUI data 518 representative of multiple training results 208 (e.g., from multiple users, welding operations, time periods, etc.) such that a user may view a comparison of training results 208. In such an example, the web GUI data 518 may additionally, or alternatively, allow for selection of one or more training results 208 for comparison based on certain criteria (e.g., geographic region, welding operation, class, instructor, user, competition, etc.). In the example of FIG. 6, the result sharing program 600 proceeds to block 608 after block 606.

In the example of FIG. 6, the result sharing program 600 transmits the location (and/or data representative of the location) where the training results 208 (and/or some representation) may be accessed. In some examples, the transmission may be to the computing system 200. In some examples, the transmission may be directly to the user (and/or user device 590) associated with the training results 208 and/or some other indicated user (and/or user device 590). For example, the result sharing program 600 may make the transmission via electronic mail to an address associated with the user (and/or user device 590). As another example, the result sharing program 600 may make the transmission via a messaging service (e.g., short message service, social media messaging, LMS service, instant messaging service, etc.) to an account associated with the user (and/or user device 590). In some examples, the result sharing program 600 may additionally, or alternatively, generate a machine readable graphic (e.g., a one dimensional, two dimensional, and/or matrix barcode) encoding the location (and/or the data representative of the location), and send the machine readable graphic at block 608.

In the example of FIG. 6, the result sharing program 600 proceeds to block 610 after block 608. At block 610, the result sharing program 600 determines whether any supplementary data should be associated with the training results 208. In some examples, this determination may comprise determining whether a user has indicated a desire to associate supplementary data with the training results 208. In some examples, the web GUI data 518 may include (and/or provide) one or more mechanisms (e.g., buttons, links, etc.) through which a user may indicate their desire to associate supplementary data with the training results 208. If the result sharing program 600 determines that no supplementary data should be associated with the training results 208, the result sharing program proceeds to block 616. If the result sharing program 600 determines that supplementary data should be associated with the training results 208, the result sharing program 600 receives the supplementary data and associates the supplementary data with the training results 208 (e.g., via central memory circuitry 506) at block 612. In some examples, the supplementary data may comprise graphical data, audio data, textual data, video data, and/or other appropriate data. In some examples, the result sharing program 600 may receive the supplementary data over the network 502 (e.g., from the user device 590). After block 612, the result sharing program 600 proceeds to block 614, where the supplementary data is transmitted to the computing system 200, then proceeds to block 616.

In the example of FIG. 6, the result sharing program 600 determines whether the training results 208 and/or supplementary data 616 should be shared with the LMS 550. In some examples, this determination may involve determining whether one or more input mechanisms (e.g., buttons, links, etc.) indicative of a desire to share the training results 208 with the LMS 550 have been activated. In some examples, a user may indicate a desire to share the training results 208 with the LMS 550 when, for example, the training results 208 may be used to show completion of an assignment of the LMS 550. If the result sharing program 600 determines the training results 208 and/or supplementary data should be shared not be with the LMS 550, the result sharing program 600 ends. If the result sharing program 600 determines the training results 208 and/or supplementary data should be shared with the LMS 550, the training results 208 (and/or data representative of the training results 208) are sent to the LMS 550 at block 618. In some examples, the result sharing program 600 may also prompt, identify, and/or receive information identifying the LMS 550, a user account of the LMS 550, and/or a learning activity of the LMS 550 at block 618. After block 618, the result sharing program 600 ends.

In some examples, some blocks of the result sharing program 600 may be skipped and/or executed in a different order. For examples, there may be times when the training results 208 (and/or training parameters) are determined and/or sent in real time (e.g., when setup in such a way at the setup/calibration block 302 of the weld training program 300). In such an example, the results sharing program 600 may provide a location where the training results 208 will be stored at block 608 (and/or provide access at block 606) prior to actually receiving and/or storing the training results 208 (and/or training parameters). In some examples, this may allow a user (e.g., using user device 590) to view the training results 208 as they are compiled, in real time, from a location remote from the display monitor 128 of FIG. 1.

FIG. 7a shows an example result sharing screen 702 that might be shown to a user (e.g., via the user device 590) when accessing the training results 208 (and/or a representation thereof) at the location provided at block 608 of the result sharing program 600. As shown, the result sharing screen 702 is presented via a web browser of the user device 590. In the example of FIG. 7a, the result sharing screen 702 presents the training results 208 via web GUI data 518 that appears similar to the training results screen 400 of FIG. 4. In some examples, the training results 208 shown in the result sharing screen 702 may be a simple image and/or screenshot, rather than an interactive interface.

In the example of FIG. 7a, the result sharing screen 702 also includes input buttons 704. In some examples, user selection and/or activation of the input button 704a may result in a signal sent to the central training system 510 indicative of a desire to associate supplemental data with the training results 208. FIG. 7b shows the result sharing screen 702 updated with supplemental data 706. In the example of FIG. 7b, the supplemental data 706 is an image of a workpiece 110, such as a workpiece 110 that the operator 118 welded when performing the welding session for which the training results 208 are applicable.

In some examples, user selection and/or activation of the input button 704b of the result sharing screen 702 may result in a signal sent to the central training system 510 indicative of a desire to share the training results 208 with the LMS 550. In some examples, user selection and/or activation of the input button 704c may result in activation of a sharing feature of the user device 590. In some examples, the sharing feature may allow for sharing of the location provided at block 608 of the result sharing program 600, and/or the training results 208 (and/or a representation thereof) with one or more social media platforms, messaging platforms, and/or other third party platforms.

FIG. 8 is a flowchart illustrating a more detailed example of the output training results block 800 of the weld training program 300 of FIG. 3. As shown, the output training results block 800 begins at block 802, where the weld training program 300 determines a cumulative package of training results 208 based on the training parameters of block 308, as discussed above. After block 802, the weld training program 300 proceeds to block 804, where the training results 208 are displayed (e.g., via display screen 129). After block 804, the weld training program 300 proceeds to block 806.

In the example of FIG. 8, the weld training program 300 determines whether the training results 208 should be transmitted to the central training system 510 at block 806. In some examples, the determination may involve determining whether a user has selected to transmit the training results 208 to the central training system 510. For example, the weld training system 100 may check (e.g., in memory circuitry 206) whether one or more settings of the weld training system 100 indicate that the training results 208 should be automatically sent to the central training system 510. In some examples, these settings might be set and/or modified at block 302 of FIG. 3. As another example, the training results screen 400 may include one or more input mechanisms (e.g., buttons, links, etc.) indicative of a desire to share the training results 208 with the central training system 510, and the weld training program 300 may determine whether one or more of the input mechanisms have been activated. In the example of FIG. 8, the weld training program 300 proceeds to block 812 if the weld training program 300 determines that the training results 208 should not be transmitted to the central training system 510. If the weld training program 300 determines that the training results 208 should be transmitted to the central training system 510, the weld training program 300 proceeds to block 808.

In the example of FIG. 8, the weld training program 300 transmits the training results 208 to the central training system 510 at block 808. In some examples, the weld training program 300 may additionally transmit a target location to store (and/or make accessible) the training results 208. In such examples, the weld training program 300 may determine the location at block 806 and/or 302 (e.g., by prompting user input and/or checking previous settings). In some examples, the weld training program 300 may transmit training results 208 for several users, time periods, weld training activities, and/or welding sessions. For example, where the user is associated with administrative and/or instructor privileges, the weld training program 300 may send training results 208 for multiple users (e.g., users associated with the class, section, instructor, etc.). In such an example, the weld training program 300 may additionally, or alternatively, transmit training results 208 corresponding to several different weld training activities, welding sessions, and/or time periods (e.g., corresponding to different classes, assignments, weld training activities, etc.). In such an example, the user may skip some or all other portions of the weld training program 300 prior to block 800.

In the example of FIG. 8, the weld training program 300 proceeds to block 810 after block 808. At block 810, a location (and/or data representative of a location) where the training results 208 are accessible is received (e.g., from the central training system 510). After block 810, the weld training program 300 proceeds to block 812, where the weld training program 300 determines whether the training results 208, the location of where the training results 208 are accessible, and/or data representative of the location should be encoded. In some examples, the determination may involve determining whether a user has selected to encode (e.g., via some prior setting and/or selection of an input mechanism). If the weld training program 300 determines the training results 208, the location of where the training results 208 are accessible, and/or data representative of the location should not encoded, the weld training program 300 proceeds to block 816. If the weld training program 300 determines the training results 208, the location of where the training results 208 are accessible, and/or data representative of the location should be encoded, the weld training program 300 proceeds to block 814.

In the example of FIG. 8, the weld training program 300 encodes the training results 208, the location (and/or target location) of where the training results 208 are accessible, and/or data representative of the location (and/or target location) at block 814. In some examples, the encoding may be done via a machine readable graphic (e.g., a one dimensional, two dimensional, and/or matrix barcode). In some examples, user information (e.g., LMS and/or other account information, permissions, privileges, credentials, etc.) may also be encoded. After block 814, the weld training program 300 proceeds to block 816 where the encoding, the training results 208, the location of the training results 208, and/or data representative of the location is outputted (e.g., via the display monitor 128 and/or one or more other output devices of the weld training system 100). In some examples, the output at block 816 may be in the form of a graphical display (e.g., via display screen 129), an audio output, a short wavelength ultra high radio frequency protocol (commonly known as Bluetooth), or a near field communication (NFC) protocol. In some examples, a user may receive the output via the user device 590, and/or use the output to share a high quality version of the training results 208.

In the example of FIG. 8, the weld training program 300 proceeds to block 818 after block 820. At block 820 the weld training program 300 determines whether the central training system 510 has sent supplemental data to be associated with the training results 208. If not, the output training results block 800 of the weld training program 300 ends. If so, then the weld training program 300 proceeds to block 818 where the supplemental data is received and associated with the training results 208. In some examples, this association is such that future output of the training results 208 will also output the supplemental data. As shown, the weld training program 300 proceeds to block 822 after block 821, where the supplemental data is displayed and/or otherwise outputted (e.g., via display monitor 128). After block 822, the output training results block 800 of the weld training program 300 ends.

FIG. 900 shows a training results update screen 900, such as might be shown to a user (e.g., via the display monitor 128) at block 822 of the output training results block 800 of the weld training program 300. As shown, the training results update screen 900 shows visual representations of the training results 208, a score 402, supplemental data 906 received from the central training system 510, and a graphical encoding 902, such as might be generated at block 814 of FIG. 8. In some examples, the user may select and/or deselect a supplemental input button 904 to choose whether the supplemental data 906 is displayed or hidden.

In some examples, a user may use a compatible reader (e.g., barcode reader) of the user device 590 to scan the graphical encoding 902. In such an example, the reader may automatically decode the encoded information and use it to access the training results 208 (e.g., via a web browser, such as shown in FIGS. 7a and 7b). Once accessed, a high quality version of the training results 208 may be more easily shared to other social media platforms (e.g., via input button 704c).

In some examples, the training results 208 may also be shared with and/or sent to the LMS 550. For example, the user may receive and/or scan the output at block 816 using the user device 590 (e.g., via camera 504 and/or I/O circuitry 592). In such an example, the user device 590 may decode the information in the graphical encoding 902 and send the information to the LMS 550. Thereafter, the LMS 550 may access the training results 208 and/or associate the training results 208 with one or more appropriate users, welding sessions, assignments, activities etc. (e.g., based on the received information).

FIG. 10 is a flowchart illustrating an example operation of a LMS program 1000 stored in LMS memory circuitry 556 of the LMS 550, and/or device memory circuitry 596 of the user device 590 of FIG. 5. In some examples, the LMS program 1000 allows for training results 208 of the weld training system 100 to be associated with one or more LMS assignments via output (e.g., the graphical encoding 902) from the weld training system 100. In some examples, the LMS program 1000a and/or corollary LMS program 1000b may be implemented in machine readable instructions stored in LMS memory circuitry 556 and/or device memory circuitry 596 and/or executed by the LMS processing circuitry 554 and/or device processing circuitry 594. In some examples, the LMS program 1000a of the LMS 550 and corollary LMS program 1000b of the user device 590 may communicate and/or operate in tandem. Thus, the following disclosure of the LMS program 1000 may be descriptive of the LMS program 1000a and/or the LMS program 1000b.

In the example of FIG. 10, the LMS program 1000 begins at block 1002. At block 1002, the LMS program 1000 receives and/or retrieves user account information. In some examples, some or all of the account information may be received from the user device 590. For example, the user device 590 may obtain the account information via manual entry, scanning and/or deciphering of the graphical encoding 902, and/or some other output of the weld training system 100 (e.g., RFID, Bluetooth, etc.). In some examples, the account information may include a unique identifier, user credentials, and/or account privileges. In some examples, some of the account information may be retrieved based on other account information. In some examples, the LMS program 1000 may compare the account information to user data stored in LMS memory circuitry 556 to determine which (if any) user is or should be logged in, and/or determine the permissions and/or privileges of the user.

In the example of FIG. 10, the LMS program 1000 proceeds to block 1004 after block 1002. At block 1004, the LMS program 1000 retrieves (e.g., from LMS memory circuitry 506) one or more learning activities associated with the user. In some examples, the LMS program 1000 may provide these learning activities to the user (e.g., via the user device 590). As shown, the LMS program 1000 proceeds to block 1006 after block 1004. At block 1006, the LMS program 1000 identifies a particular, applicable, learning activity. In some examples, this identification may be in response to one or more signals indicative of a user selection of the particular applicable learning activity (e.g., via the user interface of the user device 590). For example, a user may manually enter and/or select the applicable learning activity from the available learning activities at block 1006. As another example, the user device 590 may receive, scan, decipher, and/or decode output from the weld training system 100 that includes the applicable learning activity.

In the example of FIG. 10, the LMS program 1000 proceeds to block 1008 after block 1006. At block 1008, the LMS program 1000 prompts the user for input of the training results 208. In some examples, the prompting may comprise providing an input field configured to receive a location (and/or data representative of a location) where the training results 208 are accessible. For example, the LMS program 1000 may provide an input field where a user can input a website address where the training results 208 may be accessed. In some examples, this prompting may comprise initiating a companion process, program, and/or application. For example, the LMS program 1000 may initiate a reader that can scan and/or decode a graphical encoding 902 output by the weld training program 300. As another example, the LMS program 1000 may initiate a Bluetooth and/or NFC application configured to pair and/or initiate communication with the weld training system 100 so as to receive the output of the weld training program 300.

In the example of FIG. 10, the LMS program 1000 proceeds to block 1010 after block 1008. At block 1010, the LMS program 1000 receives the training results 208, the location where the training results 208 are accessible, and/or data representative thereof. In some examples, the training results 208 may be communicated to the LMS system 550 (e.g., from the user device 590) following reception. As shown, the LMS program 1000 proceeds to block 1012 after block 1010. At block 1012, the training results 208 are associated with the identified learning activity. In some examples, the association at block 1012 may comprise updating one or more LMS records (e.g., in LMS memory circuitry 556) to include, link to, and/or otherwise reference the training results 208. For example, the LMS program 100 may write to a database record (e.g., in LMS memory circuitry 556) associated with the identified learning activity and/or user to include, link to, and/or otherwise reference the training results 208. In some examples, the LMS program 1000 may additionally, or alternatively, analyze the training results 208 in view of one or more requirements and/or criteria of the identified learning activity. For example, the LMS program 1000 may determine whether the score 402 of the training results 208 is adequate to complete the learning activity. In some examples, the LMS program 1000 may identify the learning activity as being complete or incomplete based on the determination.

In the example of FIG. 10, the LMS program 1000 proceeds to block 1014 after block 1012. At block 1014, the LMS program 1000 provides LMS GUI data 558 representative of the training results 208, such that a user may view and/or manipulate the training results 208 via the LMS GUI data 558. In some examples, providing the LMS GUI data 558 may entail generating and/or transmitting the LMS GUI data 558 (e.g., to user device 590). In some examples, the training results 208 may be used to generate the LMS GUI data 558. In some examples, the LMS GUI data 558 may provide an interface through which a user can manipulate certain parameters (e.g., time period, visible training parameters, comparative data, etc.) to gain different perspectives, views, and/or representations of the training results 208. In some examples, providing the LMS GUI data 558 may entail providing LMS GUI data 558 representative of multiple training results 208 (e.g., from multiple users, welding operations, time periods, etc.) so that a user may view a comparison of training results 208. In some examples, the LMS program 1000 may generate the LMS GUI data 558 using multiple training results 208 (e.g., from multiple users, welding operations, time periods, etc.) such that a user may view a comparison of training results 208. For example, where the user is associated with administrative and/or instructor privileges, the training results 208 may be training results 208 for multiple users (e.g., users associated with the class, section, instructor, etc.), or there may be training results 208 for one or more other users already associated with the learning activity. In such an example, the LMS GUI data 558 may additionally, or alternatively, allow for selection of one or more training results 208 for comparison based on certain criteria (e.g., geographic region, welding operation, class, instructor, user, competition, etc.).

In some examples, the LMS program 1000 may skip some or all of the blocks of FIG. 10, and/or reorder the blocks of FIG. 10. For example, the user device 590 may receive the training results 208 at block 1010 first, using a companion process, program, and/or application, as discussed above. In such an example, information output with the training results 208 may include user account information and/or the identified learning activity, such that blocks 1002-1006 and 1012 may be implemented thereafter. As another example, the user device 590 may first receive the training results 208 at block 1010, skip block 1012, and present the training results 208 via the LMS GUI data 558 at block 1014. In such an example, the LMS GUI data 558 may thereafter provide an option to identify the learning activity. Upon selection of the option, the LMS program 1000 may execute blocks 1004, 1006, and/or 1012.

Figures 11A, 11B:
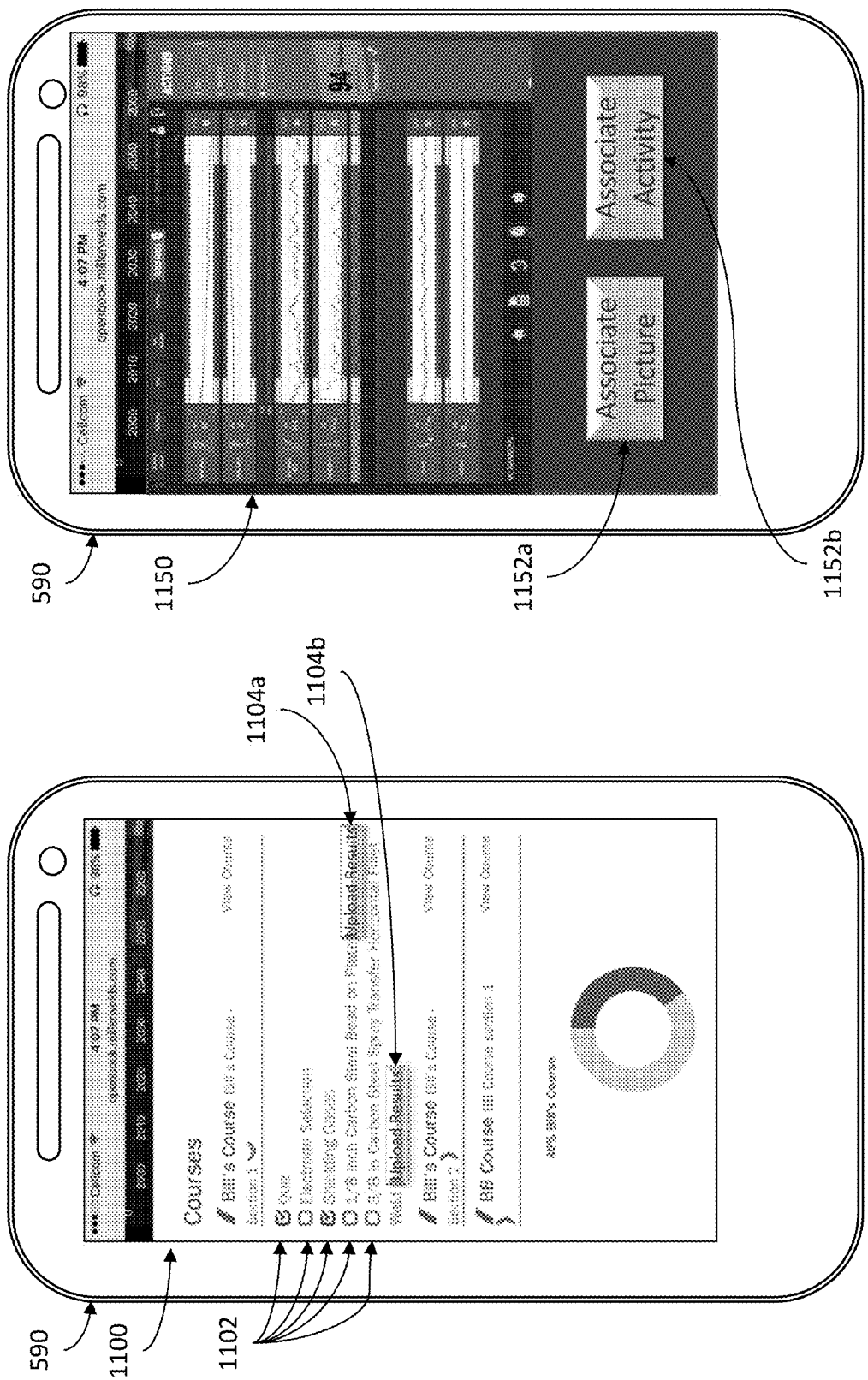
FIG. 11a shows an example LMS screen displayed on a user device, in accordance with aspects of this disclosure.
FIG. 11b shows an example LMS graphical user interface displayed on a user device, in accordance with aspects of this disclosure.

FIG. 11*a* shows an example LMS screen 1100 that might be shown to a user via the user device 590 at block 1004 of the LMS program 1000. As shown, the LMS screen 1100 shows several available learning activities 1102. Some of the learning activities 1102 are associated with selectable buttons 1104. In some examples, a user may select one of the selectable buttons 1104 to identify the particular learning activity in block 1006 of FIG. 10.

FIG. 11*b* shows an example LMS GUI screen 1150 that might be shown to a user via the user device 590 at block 1014 of the LMS program 1000 of FIG. 10. As shown, the LMS GUI screen 1150 displays a graphical representation of the training results 208, along with selectable options 1152. In some examples, selection of the option 1152*a* may allow for addition of supplemental data, which may be associated with the training results 208 and/or communicated back to the central training system 510 (e.g., as described above). In some examples, selection of the option 1152*b* may allow for identification of the particular learning activity of block 1106 (and/or 1104), and subsequent association of the training results 208.

The present disclosure provides a system through which high quality weld training results 208 may be viewed and/or shared outside of the weld training system 100. Further, the training results 208 may be associated with and/or used to complete a learning activity 1102 of a learning management system 550. Further, supplemental data may be associated with the training results 208, to provide further context and/or visual aid to the training results 208. These features may help to increase user engagement with other trainees, friends, family, and/or community during training, which may help to increase engagement and/or increase the chance that the participant will continue progressing in training.

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:

1. A weld training system, comprising:
   memory circuitry configured to store operator identification information of a weld operator;
   one or more sensors configured to detect a position or orientation of a welding torch during a weld training activity performed by the weld operator;
   control circuitry configured to:
      determine weld training data pertaining to the weld training activity based, at least in part, on the position or orientation of the welding torch, the weld training data comprising a score, a grade, a rating, a work angle, an aim, a contact to work distance, an arc length, a travel speed, a voltage, an amperage, a wire feed speed, a gas disbursement, a deposition amount, a porosity, or a penetration depth, and
      generate a machine-readable graphic, the weld training data and the operator identification information being encoded within the machine readable graphic, the machine-readable graphic comprising a barcode or a matrix barcode; and
   a display screen configured to display the weld training data and the machine-readable graphic, such that a user device of the weld operator can capture an image of the machine readable graphic off the display screen, decode the image to obtain the weld training data and operator identification information, and thereafter provide the weld training data and operator identification information to a social media or learning management system.

2. The weld training system of claim 1, wherein the machine-readable graphic comprises the matrix barcode.

3. The weld training system of claim 1, wherein the machine-readable graphic-further encodes information identifying a learning activity of a learning management system.

4. The weld training system of claim 1, further comprising communication circuitry configured to receive supplemental data from a learning management system, the control circuitry further configured to associate the weld training data with the supplemental data.

5. The weld training system of claim 4, wherein the display screen is further configured to display the supplemental data.

6. The weld training system of claim 4, wherein the supplemental data comprises image, text, video, or audio data.

7. A method of enabling sharing of weld training data with a learning management system (LMS) or social media system, the method comprising:
   detecting, via one or more sensors of a weld training system, a position or orientation of a welding torch during a weld training activity performed by a weld operator;
   determining, via control circuitry of the weld training system, the weld training data pertaining to the weld training activity based, at least in part, on the position or orientation of the welding torch, the weld training data comprising a score, a grade, a rating, a work angle, an aim, a contact to work distance, an arc length, a travel speed, a voltage, an amperage, a wire feed speed, a gas disbursement, a deposition amount, a porosity, or a penetration depth;
   generating, via the control circuitry, a machine-readable graphic that encodes the weld training data, the machine-readable graphic comprising a barcode or a matrix barcode; and
   displaying, on a display screen of the weld training system, the machine-readable graphic, such that a user device of the weld operator can capture an image of the machine-readable graphic off the display screen, decode the image to obtain the weld training data, and thereafter provide the weld training data to a social media system or a learning management system (LMS).

8. The method of claim 7, wherein the machine-readable graphic comprises the matrix barcode.

9. The method of claim 7, wherein the machine-readable graphic further encodes identifying information of a learning activity of the LMS.

10. The method of claim 7, further comprising receiving supplemental data from the LMS, via communication circuitry of the weld training system; and associating the weld training data with the supplemental data, via the control circuitry.

11. The method of claim 10, wherein the supplemental data comprises image, text, or video data.

12. The method of claim 11, further comprising displaying the supplemental data with the weld training data on the display screen.

13. The method of claim 7, wherein the machine-readable graphic further encodes operator identification information of the weld operator.

14. A weld training system, comprising:
   one or more sensors configured to detect a position or orientation of a welding torch during a weld training activity performed by the weld operator;
   communication circuitry configured for communication with a central training system;
   control circuitry configured to:
      determine weld training data pertaining to the weld training activity based, at least in part, on the position or orientation of the welding torch, the weld training data comprising a score, a grade, a rating, a work angle, an aim, a contact to work distance, an arc length, a travel speed, a voltage, an amperage, a wire feed speed, a gas disbursement, a deposition amount, a porosity, or a penetration depth,
      transmit the weld training data to the central training system, via the communication circuitry, receive from the central training system, via the communication circuitry, location data representative of a memory location of the central training system where the weld training data can be accessed, and generate a machine-readable graphic that encodes the location data; and a display screen configured to display the weld training data and the machine-readable graphic, such that a user device of the weld operator can capture an image of the machine-readable graphic off the display screen, decode the image to obtain the memory location where the weld training data can be accessed, and thereafter provide the weld training data to a social media system or a learning management system (LMS).

15. The weld training system of claim 14, wherein the machine-readable graphic comprises a barcode or a matrix barcode.

16. The weld training system of claim 14, wherein the machine-readable graphic further encodes information identifying a learning activity of the LMS.

17. The weld training system of claim 14, further comprising memory circuitry configured to store operator identification information of the weld operator, the machine-readable graphical encoding further encoding the operator identification information.

18. The weld training system of claim 14, wherein the control circuitry is further configured to receive, via the communication circuitry, supplemental data, and associate the weld training data with the supplemental data.

19. The weld training system of claim 18, wherein the supplemental data comprises image, text, or video data.

20. The weld training system of claim 19, wherein the display screen is further configured to display the supplemental data with the weld training data.

* * * * *